Sept. 15, 1931.  A. HUND  1,822,928
PIEZO ELECTRIC PLATE
Original Filed Sept. 30, 1925  2 Sheets-Sheet 1
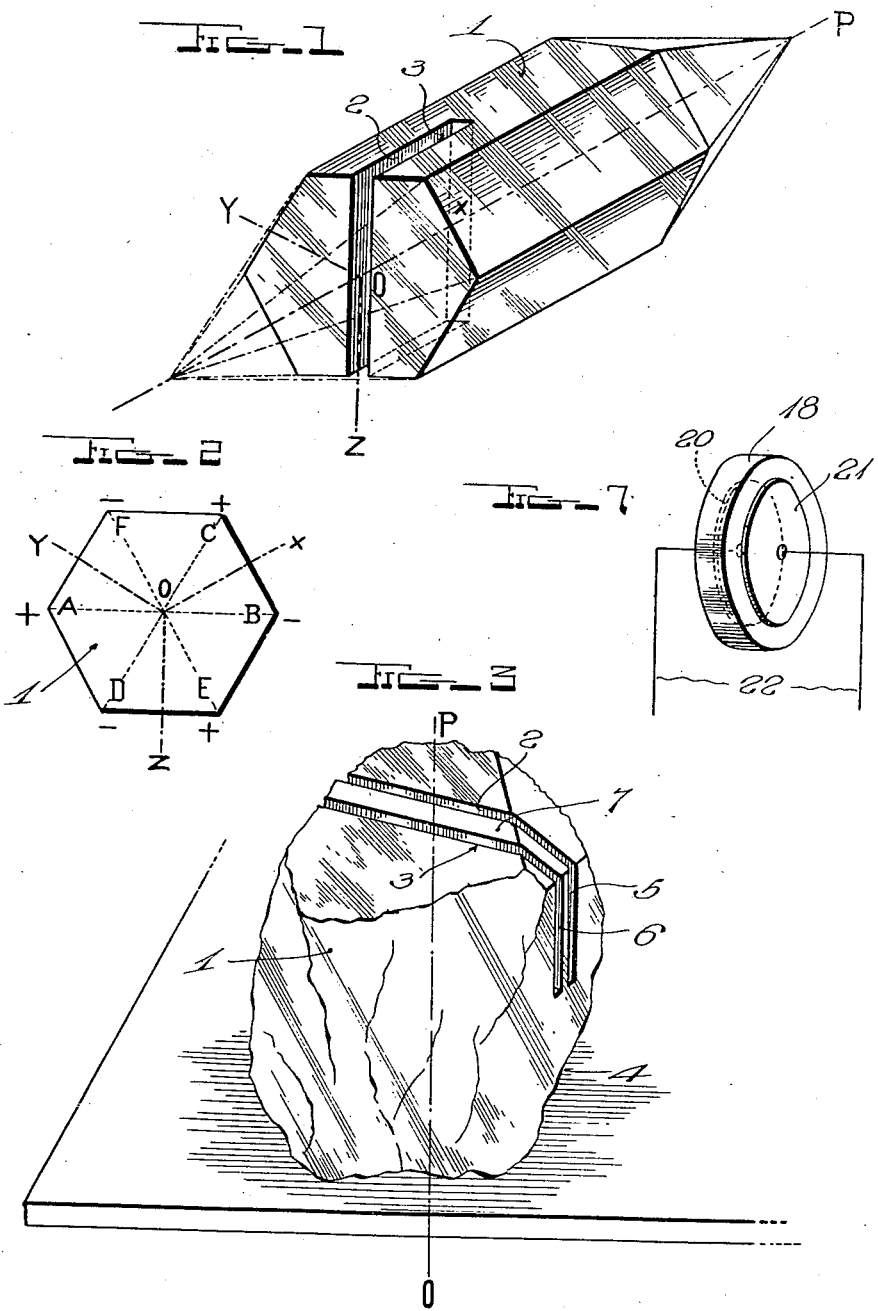
Inventor:-
August Hund,
by John B. Brady
Attorney Sept. 15, 1931.  A. HUND  1,822,928
PIEZO ELECTRIC PLATE
Original Filed Sept. 30, 1925  2 Sheets-Sheet 2
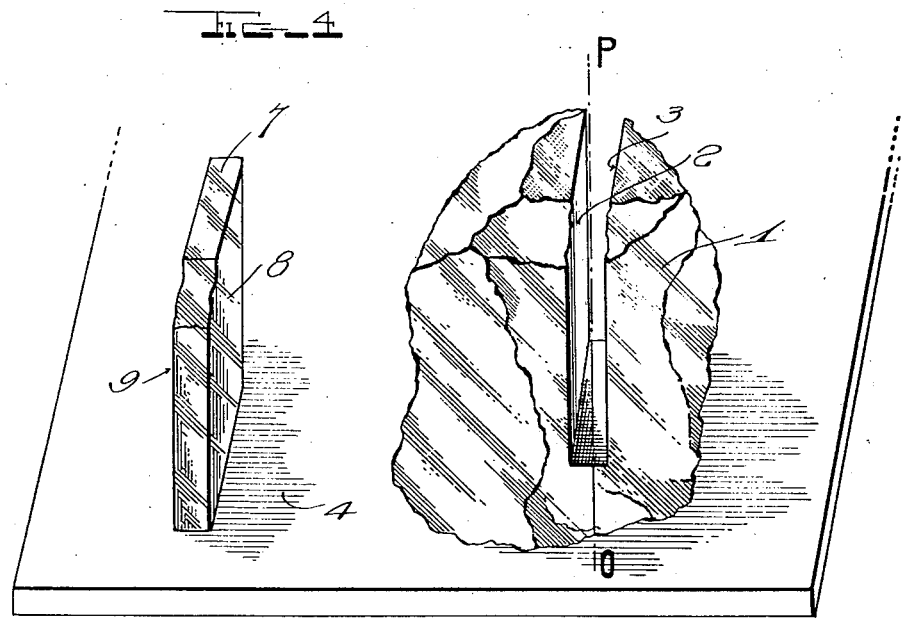
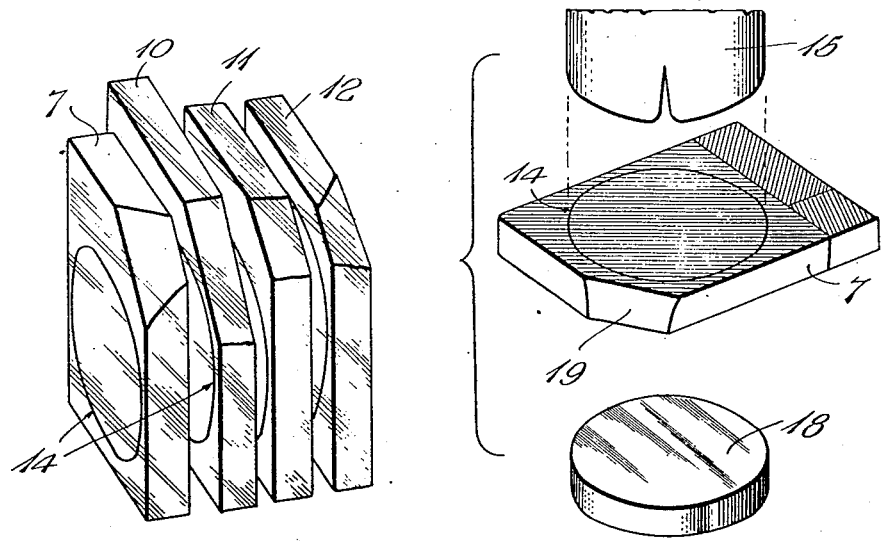
Inventor:-
August Hund,
by John B. Brady.
Attorney Patented Sept. 15, 1931

1,822,928

UNITED STATES PATENT OFFICE

AUGUST HUND, OF BETHESDA, MARYLAND, ASSIGNOR, BY MESNE ASSIGNMENTS, TO FEDERAL TELEGRAPH COMPANY, A CORPORATION OF CALIFORNIA

PIEZO ELECTRIC PLATE

Application filed September 30, 1925, Serial No. 59,677. Renewed July 8, 1929.

My invention relates broadly to piezo electricity, and more particularly to the manufacture of piezo electric plates used for generation of oscillations by piezo electric effects.

The object of my invention is to provide an improved method for forming piezo electric plates for use as piezo electric oscillators where plates having uniform oscillatory characteristics may be produced upon a large scale without substantial variation in the frequency of the oscillations produced.

Still another object of my invention is to provide a method of cutting piezo electric plates from bodies of material exhibiting piezo electric properties where the plates will operate at definite frequencies for the production of predetermined frequencies with a high degree of accuracy.

Another object of my invention is to provide a method of cutting piezo electric plates from crystalline bodies in a direction parallel to the optical axis of the body and along predetermined piezo electric axes whereby piezo electric plates may be produced in large quantities each having uniform oscillatory characteristics.

Still another object of my invention is to provide a method of cutting piezo electric plates in certain definite shapes which I have discovered contribute to the development of constant frequency oscillations of a predetermined definite frequency.

My invention eliminates the uncertainty of the operation of piezo electric plates which has heretofore existed where it has been the usual practice to merely select any form of crystal and connect it in an electrical circuit for observing its electrical characteristics. By my present invention I establish definite rules for the cutting of piezo electric plates from bodies of material possessing piezo electric properties in such manner that the performance or the operating characteristics of the piezo electric plates may be foretold with accuracy. In this manner great numbers of piezo electric plates may be produced on a quantity production scale which will exhibit the same uniform piezo electric effects for the production of oscillations which will have similar frequency characteristics.

With the many recent developments in piezo electric crystal control systems the demand for accurately operating piezo electric plates possessing piezo electric properties has become very large. Accordingly, the need for a uniform process of cutting plates on a large scale whereby plates of uniform oscillatory characteristics may be produced in large quantities may be readily appreciated. Certain crystalline bodies which lack symmetry, such as Rochelle salt, tourmaline, silicate of zinc, cane sugar, quartz and boracite exhibit electrical charges at particular regions when subjected to stresses or when heated or cooled. In the former case, the effect is called piezo electric, and in the latter, pyro-electric. All piezo electric substances are pyro-electric and it is doubtful if any pyro-electric effect would be obtained if stresses were eliminated.

The effect of pressure on crystalline substances was discovered by P. and J. Currie. Though Rochelle salt seems to have the greatest piezo electric effect and quartz a comparatively small one, the latter substance seems, on account of its mechanical superiority, to be more suitable for the applications as an oscillator within the range of radio frequencies. For the purposes of explaining the principles of my invention I have selected quartz as a material from which the piezo electric plates are cut. It is true, that in employing quartz plates it is necessary to sacrifice to a certain extent piezo electric activity in order to gain mechanical superiority and yet more practical operation is assured. Quartz crystallizes in a uniform shape which will hereafter be set forth in more detail. I have discovered that quartz disks when cut in certain definite shapes along the piezo electric axes and parallel to the optical axis of the crystalline quartz body exhibit uniform constant frequency oscillatory properties such as will permit of the duplication of piezo electric plates of similar characteristics on a large scale.

My invention may be more fully understood from the following specification by reference to the accompanying drawings, in which:

Figure 1 is a perspective view illustrating a crystalline body of quartz and the method which I employ in cutting a piezo electric quartz plate from the crystalline body; Fig. 2 is a diagrammatic view taken along the lateral axis of the crystalline body at right angles to the optical axis of the crystalline body; Fig. 3 shows a relatively large piece of natural quartz supported on a surface perpendicular to the optical axis of the crystalline body and illustrating a quartz plate being cut from the crystalline body; Fig. 4 shows a crystalline body of quartz supported on a plane perpendicular to the optical axis thereof and showing a quartz plate cut out of and severed from the crystalline body; Fig. 5 shows a number of quartz plates which have been sliced from a quartz crystal preparatory to being cut in definite shapes; Fig. 6 shows one method of cutting disks from the flat plates sliced from the crystalline body; and Fig. 7 is a view showing an illustrative embodiment of a completed quartz plate positioned between metallic plates which may be electrically connected with a suitable control circuit.

With particular reference to Fig. 1 of the drawings, the natural crystalline shape of a body of quartz 1 has been illustrated in perspective view. Looking at the lateral cross-section of the quartz body 1 as illustrated in Fig. 2, there are different piezo electric axes represented at AB, CD, and EF. The optical axis of the crystalline body is indicated in Fig. 1 by line OP and the quartz plates are cut from the quartz body in planes parallel to the optical axis. The quartz plates are also cut parallel to the axes OX, OY, or OZ. There are a number of ways of cutting the slices out of the natural crystal. One method is to use a cutting tool in the form of a disk of galvanized iron or copper which revolves against the crystal. This disk is advanced into the crystal with the aid of carborundum powder mixed with a suitable amount of water, enabling the slices to be cut out of the crystalline body. This cutting operation can also be performed by a cutting disk of copper whose circumference is finely ribbed and charged with diamond dust and using a steady flow of kerosene against the cutting edge. Other abrasive mixtures may be used in the cutting process and I mention carborundum powder merely for the purposes of illustration. In Fig. 1 the slice made by the cutting tool leaves the parallel extending walls 2 and 3 as illustrated.

Fig. 3 shows the crystalline body 1 in its natural shape on a surface 4 which is perpendicular to the optical axis OP and where slots 5 and 6 have been cut by a suitable cutting tool leaving the flat plate 7 of a thickness dependent upon the selected spacing between the cuts and the cutting tool for producing a quartz plate having predetermined frequency characteristics.

In Fig. 4 I have shown the flat plate 7 entirely removed from the crystalline body 1 with the surfaces 8 and 9 of the plate 7 parallel to each other and parallel to a plane which passes through the optical axis of the crystalline body 1.

In Fig. 5 I have shown plates 7, 10, 11 and 12 which have been sliced from the crystalline body in planes parallel to the optical axis. The plates are cut of a predetermined thickness in accordance with the frequency which it is desired to produce from the crystals.

The surfaces of the plates should be parallel so that the slicing operation must be performed with care or the surfaces must be trued up by subsequent grinding. The slices may be cut from the natural crystal by means of a revolving tool as has been heretofore described. The faces are ground parallel if necessary by first using #60 carborundum powder with water and next using #150 carborundum powder with water. The finishing operation may be accomplished by using #140 emery powder mixed with water and subsequently using #302 emery powder followed by #303 emery powder. If necessary, the crystals can be polished with rouge. It has been found that crystals polished to transparency often chip off near the edges for which reason the edges are beveled. The chipping occurs usually several days after the preparation of the quartz plate has been completed. This may give rise to slightly different natural periods or prevent the plate from oscillating. The breaking off of small pieces may be due to either excessive mechanical vibrations or to strains left on the polished surface of the crystal.

I have found that there are generally three fundamental modes of natural oscillation possible when the disks are cut as indicated. Often two of the natural frequencies are close together while the third frequency is more widely separated from the other two frequencies. The reason for this is that the thickness of the plates is small in comparison to the other dimensions.

In order that I may produce large numbers of crystals which will have uniform frequency characteristics I impart to the quartz plates a certain definite shape. I have found that piezo electric disks of circular formation exhibit remarkably uniform properties. These disks are cut in circular formation as has been represented by line 14 in Fig. 5.

In Fig. 6 I have shown a revolving cutting tool 15 which is fed against the substantially rectangular quartz plate 7 and with the aid of carborundum powder and water a circular disk 18 cut from the rectangular plate 7 along the line indicated at 14. The plate 7 may not be exactly rectangular for the corners at 19 may be chipped away in which case it is necessary to cut either a smaller rectangular plate or the disk 18 from such a position in the quartz plate that a complete circular disk is obtainable having true faces and sides. This process of cutting often leaves a residue in the form of small pieces of quartz such as I have represented by the opposed cross hatching which pieces may be trued up and used for electric purposes.

Where a plate is cut from a crystalline body and along planes as brought out above irrespective of whether the plate is rectangular or circular in shape, the plate has, for a thickness which is small in comparison to the other two dimensions, a fundamental frequency due to the thickness in accordance with the following formula:

$$f_3 = \frac{2870}{t}$$

where $f$ is expressed in kilocycles (kc.) per second, and the thickness in millimeters (mm.). The other two frequencies which are lower and due to the other dimensions cannot be calculated from the above empirical formula in the case of rectangular plates, but for circular disks I have discovered after computing a mean value from a great many independent observations that the other frequencies are governed by the following laws:

$$f_1 = \frac{2715}{d}$$

$$f_2 = \frac{3830}{d}$$

where the frequencies $f_1$ and $f_2$ are expressed in kilocycles (kc.) per second and $(d)$ the diameter of the disk is expressed in millimeters (mm.). All three empirical values can be readily used for designing a quartz plate since the actual values obtained afterwards do not deviate more than a very small percentage.

I have investigated a large number of piezo electric plates of rectangular shape cut according to the process herein described and find that while they exhibit piezo electric properties substantially uniform over a series of plates, it is impracticable to accurately foretell the two lower frequencies which these plates may possess. It is difficult to determine reliable formulæ for the two longer waves of rectangular plates since the values deviate too much from the mean value. The average value for the lowest frequency gives a characteristic constant of $K_1 = 2785$ and for the medium frequency $K_2 = 2745$. But it is important to note that the average value gives the value for the constant $K_3 = 2865$ as compared with 2870 which holds for the thickness vibration (normally the highest frequency) and gives as brought out above a reliable formula. On the other hand by cutting the plates in circular formation to predetermined dimensions in accordance with formulæ herein set forth, I find that uniform results can be obtained throughout large numbers of plates. Circular disks possess the marked advantage of being cut quicker since only two faces need to be paralleled. When plates are not cut in the manner set forth herein, it is not possible to foretell the operating results and it is often possible to obtain four or more fundamental frequencies from the plates which may or may not be desirable in various practical applications of piezo electric plates. It is important that the faces of the plates are exactly parallel since otherwise the frequency spectrum of the highest frequency may give several values or not appear at all. That is, a mistake in truing up the faces of the plates may result in the difference between a good oscillator and a plate which is difficult to set into oscillation.

Figure 7 represents diagrammatically a circular piezo electric disk 18 positioned between two metallic plates 20 and 21 which connect to any desired form of oscillator or control circuit connected to leads 22. The oscillations produced may be used to control an electron tube system and the amplitude of such vibrations increased to effectively actuate any desired circuit.

As to the explanation of the three fundamental vibrations as set forth by the above formulæ, it can be said that according to the piezo electric theory, two vibrations are possible. There can be no direct electrical effect, however, along the optical axis. But it can be explained as follows:

(1) The highest frequency according to the thickness of the plate is possible since a polarization along this axis perpendicular to the two metal layers which contact with opposite sides of the crystal is possible.

(2) Another fundamental vibration along the faces parallel to the metal layers is possible, as mentioned above, as long as it is not along the optical axis.

(3) The third vibration along the optical axis seems impossible according to the theory of piezo-electricity but can be explained by indirect effects. A contraction across a set of small faces and perpendicular to the optical axis produces an expansion along the optical axis and vice versa, and will disarrange the molecules along this axis and produce oscillation which can be determined indirectly from the dimensions along the optical axis.

Another way of explaining the third vibration would be to realize that the vibration is transmitted as a longitudinal and a transverse wave motion through the plate; the respective velocities of these two motions being different, they produce the low-frequency vibrations instead of one vibration.

It will be observed that piezo electric plates cut according to the process set forth herein may be produced in large quantities, each plate having uniform characteristics similar to the properties of another plate. The applications of piezo electric plates are very numerous and new applications are being rapidly discovered.

The circular piezo electric disks of my invention are readily adaptable in piezo electric gauges used in determining the vibration of guns and in oscillograph operation. The plates are ideally adapted for connection in the input circuits of electron tube systems for controlling radio transmitting and receiving apparatus at constant frequency. The piezo electric disks are also adapted for use in controlling the constant frequency operation of wired radio and carrier wave signaling systems where it is very important that the frequencies in several channels which are being simultaneously operated over the same line wire circuit be held constant. They are also applicable to circuits where the carrier wave at a transmitting station is suppressed and restored at a receiving station. Since quartz disks can be cut to exactly the same frequencies by using two such plates, one at the transmitter and the other at the receiving station identical carrier waves are guaranteed.

While I have pointed out the desirability of cutting the plates into circular disks, my invention also contemplates the forming of plates in other definite shapes such as square, oblong, oval and other predetermined forms, for securing piezo electric operation according to definite laws. I desire that it be understood that other modifications of the invention may be practiced and that no limitations upon the invention are intended other than are imposed by the scope of the appended claims.

What I claim and desire to secure by Letters Patent of the United States is as follows:

1. A piezo electric oscillator which comprises a flat circular disk of crystalline material possessing piezo electric properties in which the diameter of the disk is coincident with a plane parallel to the optical axis of the crystalline body from which said disk is formed.

2. A piezo electric resonator which comprises a flat circular disk of crystalline material possessing piezo electric properties which has the flat surfaces thereof in planes parallel to the optical axis of the crystalline body from which the disk is formed.

3. An oscillator exhibiting piezo electric properties which consists of a flat circular disk member cut from a crystalline body in planes parallel to the optical axis of the crystalline body to a thickness where the member possesses at least one fundamental frequency of oscillation which satisfies the following formula:

$$f_s = \frac{2870}{t}$$

where $f_s$ is the frequency expressed in kilocycles per second and $t$ represents the thickness of the member in millimeters.

4. An oscillator exhibiting piezo electric properties which consists of a flat circular disk cut to such diameter and thickness that the disk possesses at least three fundamental frequencies which satisfy the following formulæ.

$$f_1 = \frac{2715}{d}$$

$$f_2 = \frac{3830}{d}$$

$$f_3 = \frac{2870}{t}$$

where $f_1$, $f_2$ and $f_3$ represent frequencies of oscillation expressed in kilocycles per second, $d$ represents the diameter of the disk in millimeters, and $t$ represents the thickness of the disk in millimeters.

5. A resonator exhibiting piezo electric properties which consists of a circular disk cut from a crystalline body along the optical axis thereof, and a plane parallel to the optical axis thereof which oscillates according to the formula:

$$f_s = \frac{2870}{t}$$

where $f_s$ is the frequency expressed in kilocycles per second, and $t$ is the thickness of the disk expressed in millimeters.

6. A quartz piezo-electric oscillator of disk shape having its plane parallel to the optic axis.

7. A piezo-electric resonator comprising a flat disk of quartz the peripheral edge of which is rounded and the plane surfaces of which are parallel to the optical axis of said quartz.

8. A piezo-electric oscillator of disk shaped crystal having its plane parallel to the optic axis and possessing a fundamental frequency which is a function of its thickness.

9. A piezo-electric oscillator of cylindrically cut quartz having its bases parallel to the optic axis and possessing at least two fundamental frequencies which are functions of its diameter.

In testimony whereof I affix my signature.

AUGUST HUND.